(12) United States Patent
Guillot et al.

(10) Patent No.: US 10,663,349 B2
(45) Date of Patent: May 26, 2020

(54) ILLUMINATION DEVICE FOR AN APPARATUS FOR ESTABLISHING THE COLOR OF A TOOTH, APPARATUS FOR ESTABLISHING THE COLOR OF A TOOTH, COMPRISING SAID ILLUMINATION DEVICE

(71) Applicant: BOREA, Limoges (FR)

(72) Inventors: Julien Guillot, Limoges (FR); Frédérik Rougier, Thouron (FR)

(73) Assignee: BOREA, Limoges (FR)

( * ) Notice: Subject to any disclaimer, the term of this patent is extended or adjusted under 35 U.S.C. 154(b) by 0 days.

(21) Appl. No.: 16/079,371

(22) PCT Filed: Feb. 23, 2017

(86) PCT No.: PCT/EP2017/054224
§ 371 (c)(1),
(2) Date: Aug. 23, 2018

(87) PCT Pub. No.: WO2017/144606
PCT Pub. Date: Aug. 31, 2017

(65) Prior Publication Data
US 2019/0056272 A1    Feb. 21, 2019

(30) Foreign Application Priority Data
Feb. 23, 2016   (FR) ...................... 16 51452

(51) Int. Cl.
*G01J 3/51*   (2006.01)
*G01J 3/50*   (2006.01)
*G01J 3/10*   (2006.01)
*G01J 3/02*   (2006.01)

(52) U.S. Cl.
CPC ............. *G01J 3/508* (2013.01); *G01J 3/0208* (2013.01); *G01J 3/10* (2013.01); *G01J 3/501* (2013.01)

(58) Field of Classification Search
CPC ....................................... G01J 3/508
USPC ....................................... 356/369
See application file for complete search history.

(56) References Cited

U.S. PATENT DOCUMENTS

| | | | |
|---|---|---|---|
| 6,454,437 B1 * | 9/2002 | Kelly | G01J 3/10 359/287 |
| 7,756,327 B2 | 7/2010 | Komiya et al. | |
| 7,876,955 B2 | 1/2011 | Komiya et al. | |
| 2002/0196438 A1 * | 12/2002 | Kerschbaumer | G01J 3/50 356/327 |

(Continued)

FOREIGN PATENT DOCUMENTS

EP   1 528 380 A1   5/2005

OTHER PUBLICATIONS

International Search Report, dated Jun. 28, 2017, from corresponding PCT application No. PCT/EP2017/054224.

*Primary Examiner* — Tarifur R Chowdhury
*Assistant Examiner* — Omar H Nixon
(74) *Attorney, Agent, or Firm* — Young & Thompson (57) ABSTRACT

Disclosed is an illumination device for an apparatus for establishing the color of a tooth, including in the mouth, the illumination device including a support with a lens system that includes at least one lens, an illumination unit, image capturing unit, and a front protection. The illumination unit is arranged at the periphery of the visual field of the lens system.

8 Claims, 6 Drawing Sheets

(56) References Cited

U.S. PATENT DOCUMENTS

| | | | |
|---|---|---|---|
| 2006/0152586 A1* | 7/2006 | Komiya | A61B 5/0088 |
| | | | 348/207.99 |
| 2008/0192235 A1 | 8/2008 | Komiya et al. | |
| 2009/0181339 A1* | 7/2009 | Liang | A61B 1/0638 |
| | | | 433/29 |
| 2010/0141931 A1 | 6/2010 | Ramirez Mancilla et al. | |
| 2014/0015928 A1* | 1/2014 | Koinig | A61B 1/00193 |
| | | | 348/45 |
| 2015/0305627 A1* | 10/2015 | Islam | G01J 3/453 |
| | | | 433/27 |

* cited by examiner

ILLUMINATION DEVICE FOR AN APPARATUS FOR ESTABLISHING THE COLOR OF A TOOTH, APPARATUS FOR ESTABLISHING THE COLOR OF A TOOTH, COMPRISING SAID ILLUMINATION DEVICE

BACKGROUND OF THE INVENTION

Field of the Invention

This invention relates to an illuminating device for an apparatus for establishing the color of a tooth, including in the mouth.

The object of the invention is an apparatus for establishing color that incorporates this illuminating device.

Description of the Related Art

As a part of dental services, the making of a prosthesis poses technical problems that are currently very well mastered. On the other hand, there persist problems of color, yet this parameter is an ultimately essential parameter because it is the one that is quite visible and that makes possible an excellent integration or not of a dental prosthesis.

BRIEF SUMMARY OF THE INVENTION

A patent application, in the name of the same applicant, relating to an apparatus for establishing color has made it possible to make great progress in the quality of establishing color and in its restoration, even in its monitoring during manufacturing so as to prevent disparities in the production chain.

The object of this apparatus is an apparatus for measuring dental color comprising a case, a handle and a measuring head, this measuring head comprising:
- a hollow body extending along a longitudinal axis, said hollow body comprising a proximal end, a distal end that is bent in relation to the longitudinal axis, said distal end being provided with a removable tip intended to come into contact with a surface of a tooth to be analyzed,
- at least one light source and means for acquiring images that are secured to the hollow body, said hollow body being able to transmit the light of said light source from the proximal end to the distal end,
- said apparatus comprising, in addition, a set of orientations that make it possible to mount the proximal end of the hollow body in the case so that the measuring head occupies different angular positions in relation to the case.

The light is therefore transmitted through the hollow body. The object of this invention is another illuminating means that is able, on the one hand, to bring improvements to the current illuminating means and, on the other hand, to be substituted for the means of this device but also to be configured in any other device for establishing color.

The object is to avoid any loss of illuminating power during a guiding of the light. Actually, when the light is guided, the material can affect the power by its transmission coefficient. Also, the presence of the means for acquiring images in the light beam reduces the emitting surface in exiting the hollow body.

To impart to the device an ergonomic design that greatly improves establishing color by an effective application against the tooth, a bent distal end is provided and the guiding of the light can be influenced by the bend or generally by any deformation.

The illuminating means upstream from the hollow body can lead to a disparity in the distribution of light on the illuminated surface depending on the light source that is being used, when the entire source is not being used, particularly in the case of illumination by LEDs.

To compensate for and obtain a suitable illumination, the solution consists in increasing the power of the source, but then it is necessary to be able to manage the induced thermal effects, stability, service life of the LEDs, electro-optical performance, and the protection of said LEDs.

The manufacture of the optical guide requires the use of a specific material for the light guide with a desired index of refraction. Generally, a peripheral over-molding makes possible gripping with a good quality of contact, the protection of the light guide, or even the disturbance of the beam by outside illuminations. Above all, the over-molding has an index of refraction that is determined in relation to that of the waveguide so as to ensure the guiding of the light.

The material generally used is PMMA, poly(methyl methacrylate), whose molding must be ensured by avoiding any air bubble and any inclusion, which, on the one hand, leads to a delicate molding operation and, on the other hand, greatly affects reproducibility.

Although the existing device is quite satisfactory, it is possible to improve it to make it more precise, simpler and with a reduced manufacturing cost, with improved performances, less energy consumption, and a very high reproducibility for quality industrial manufacturing.

The illuminating device that is provided to be associated with an apparatus for establishing color in a dental environment according to this invention, generally comprising a support with its objective provided with at least one lens, illuminating means, image capturing means, a front-end protection, is unique in this sense that the illuminating means are placed on the periphery of the objective.

These illuminating means, according to a characteristic of this invention, comprise micro-LEDs placed on the periphery of the objective.

These micro-LEDs are more particularly mounted on a ring on the periphery of the objective.

The invention also proposes protecting the objective from the photons emitted by said micro-LEDs by positioning reflective isolating means.

The micro-LEDs have different colors, with a range of angles of specific diffusion, a specific number.

The invention covers the apparatus for establishing color including the illuminating device according to the invention.

BRIEF DESCRIPTION OF THE DRAWINGS

The illuminating device according to this invention is described in detail according to a particular embodiment, to be considered as nonlimiting, this embodiment having only one exemplifying aim. In these drawings, the different figures show.

DETAILED DESCRIPTION OF THE PREFERRED EMBODIMENTS

Figure 1:
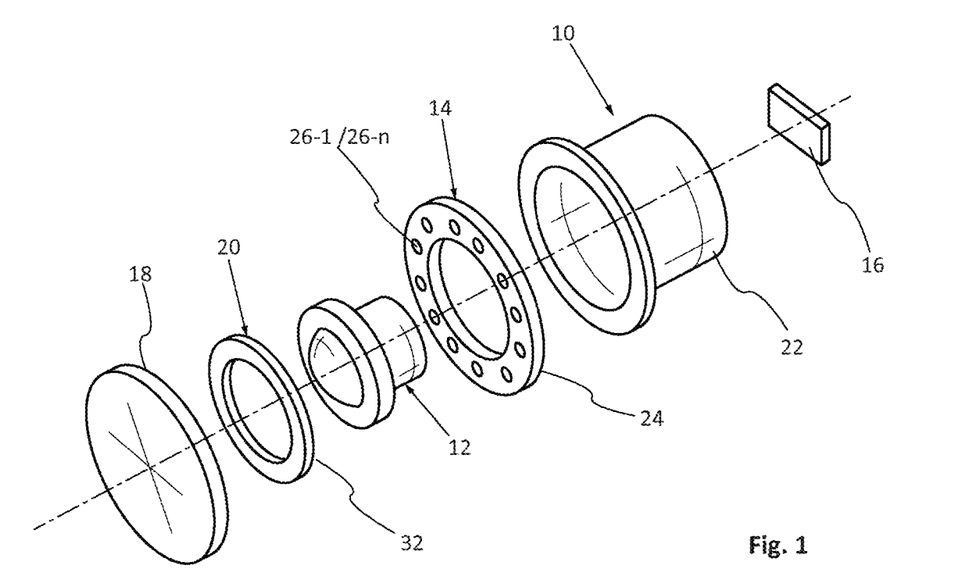
FIG. 1: an exploded perspective view of the illuminating device incorporated in an apparatus for establishing color.

The apparatus according to this invention comprises a support 10 intended to receive an objective 12 with at least one lens and defining a field of vision, illuminating means 14, image capturing means 16, a front-end protection 18 and reflective isolating means 20.

The support 10 is advantageously a blind cylinder 22 that receives at the back the image capturing means 16 and on the front the objective 12. The blind cylinder is shown diagrammatically.

In this embodiment, the objective 12 has been positioned to the right of the illuminating means 14, but the objective could be set back, and in this case, it is no longer the objective that is involved but the field of vision of said objective.

For the rest of the description, "objective" will be mentioned, but it could also be understood as "field of vision of the objective" depending on the position of said objective.

In the following embodiment, the objective is placed to the right of the illuminating means.

In all cases, the object is to position these illuminating means 14 in the immediate proximity of the tooth involved so as to limit the disturbances to the quality of said illumination. "Immediate proximity" is defined as a distance that can be within a range of distance of 5 mm to 50 mm.

The blind cylinder 22 carries a peripheral collar on its free edge so as to be able to receive the illuminating means 14.

These illuminating means are placed on the periphery of the objective 12; the light sources, themselves, are placed on the periphery of said objective 12.

These illuminating means comprise, according to the preferred embodiment used, a ring 24 on which micro-LEDs 26-1-26-n are mounted. The ring 24 has an inside diameter approximately equal to that of the objective so as to engage on the periphery of the objective 12.

These micro-LEDs are powered, in a controlled way, by a power circuit 28 positioned behind the base of the blind cylinder 22. Connecting wire means 30 connect the micro-LEDs and the power circuit 28.

It is noted that the power circuit 28 is, in a necessary way, a generator of calories but that the other components of the illuminating device are not affected by these emitted calories.

The number of micro-LEDs is between 2 and 8 per color to give a general idea, the color number being 7 and each micro-LED having a diameter of 1.3 to 1.7 mm.

Certain micro-LEDs can be of the RGB (Red, Green, Blue) type so as to limit the size further while keeping the choices of the spectral bands of emission selected.

A guide can be provided to position the ring 24 and thus to ensure a reproducibility and a consistency of the illumination in the illuminating devices according to the invention.

The front-end protection 18 has as its object the mechanical protection and the shielding of the objective.

This protection, in the form of a filter, can be neutral or of the polarizing type so as to limit glare.

So as not to disturb the objective 12 and especially the image capturing means 16, it is envisaged, according to this invention, to place a reflective isolating annular screen 32 positioned downstream from the ring 24 carrying the micro-LEDs in considering the light path and upstream from the front-end protection 18.

This annular screen 32 can take the form of a disk, particularly of metal or plastic material, whose outside diameter corresponds to the outside diameter of the objective and whose inside diameter is greater than or equal to the lens of said objective. This disk does not have mechanical strength requirements; it involves only a screen.

The light beams emitted by each of said micro-LEDs do not disturb the sensor 16 of direct incidence through the objective, the reflective isolating annular screen 32 ensuring a caching function. Likewise, this screen also prevents reflective emissions that would come from the light reflected by the front-end protection 18.

Thus, the light emitted by the micro-LEDs is propagated through the front-end protection 18, and essentially the light reflected by the illuminated surface, in this case the surface of a tooth, is received by the sensor 16.

In the embodiment, to give an example, the dimensions of the various elements are:

Diameter of the front-end protection=18 mm
Inside diameter of the annular screen 32=7.5 mm
Outside diameter of the annular screen 32=10 mm
Outside diameter of the objective 12=10 mm
Outside diameter of the support ring 24 of the micro-LEDs=18 mm
Diameter of the image capturing means 16=1.2×1.2 mm The ring 24 according to this invention comprises 4 sets of micro-LEDs, with dimensions between 1.3 and 1.7 mm, evenly distributed angularly, each set of micro-LEDs having:

1 RGB (Red/Green/Blue) micro-LED: 470 nm, 525 nm, 625 nm
1 white LED
1 447 nm LED
1 590 nm LED
1 655 nm LED These choices relate to the embodiment selected by way of example but can vary as a function of numerous parameters linked to the objective, to the image capturing means, to the software for processing the images, in particular. The device according to this invention necessitates determining the number of micro-LEDs so as to optimize the result and the characteristics of these micro-LEDs.

Figure 2:
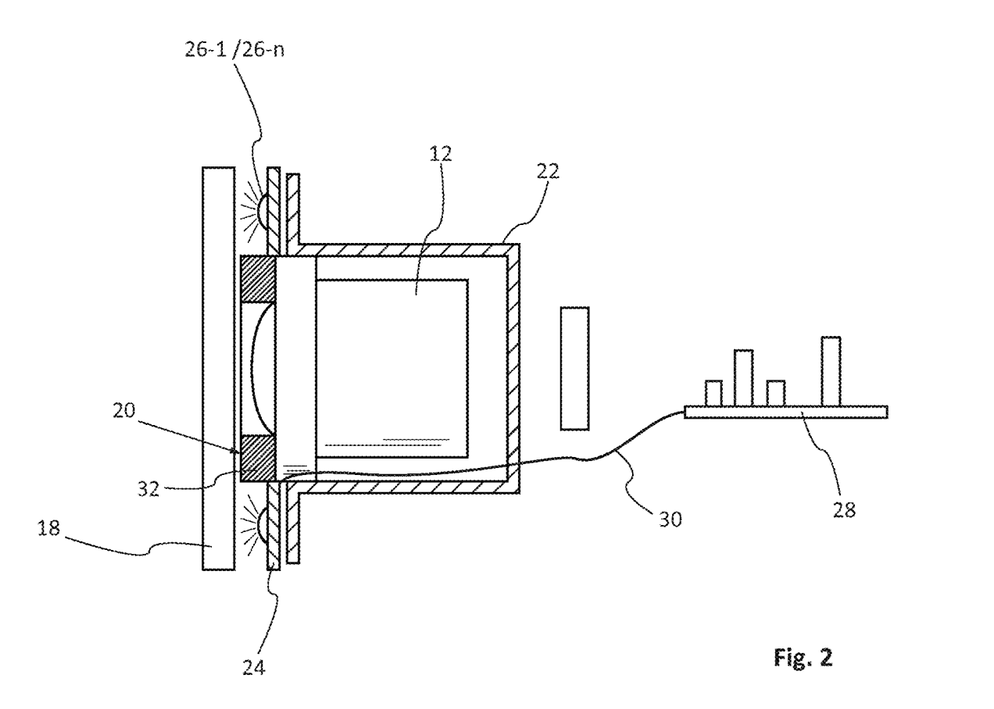
FIG. 2: a functional transverse cutaway view of the apparatus for establishing color.

In FIG. 2, the results obtained with micro-LEDs having different emission cones have been shown, these angles of emission conicity going from 60 to 140 degrees.

According to the embodiment, the number of micro-LEDs is fixed at 20, the 4 sets of 5 micro-LEDs indicated above, so as to illuminate a white target at a distance of 14 mm.

It is found that the greatest consistency is obtained with the largest emission angle.

Nevertheless, one parameter must also be taken into account, namely the existence and/or the availability of the micro-LEDs concerned. In this case, a cone with a minimum of 120° degrees and a maximum of 140° is the best compromise, very suitable because such micro-LEDs are available on the market at prices compatible with dental application and an industrial production.

Once the choice of the angle of illumination of the cone is made, it is necessary to analyze the influence of the necessary number of micro-LEDs.

Also, since the micro-LEDs are a single color, 7 colors are selected. The white color makes possible the taking of photos. The other micro-LEDs are loaded sequentially to establish a color establishing cycle. It is noted that the spectral bands of emission are selected narrowly so as to have a pure color.

The question is to determine whether it is necessary to have 2, 4, 6 or 8 micro-LEDs for each color, which would lead to a total number of micro-LEDs on the ring equal to 14, 28, 42 or 56, knowing that it is possible to provide RGB micro-LEDs so as to limit the number precisely.

Figure 3:
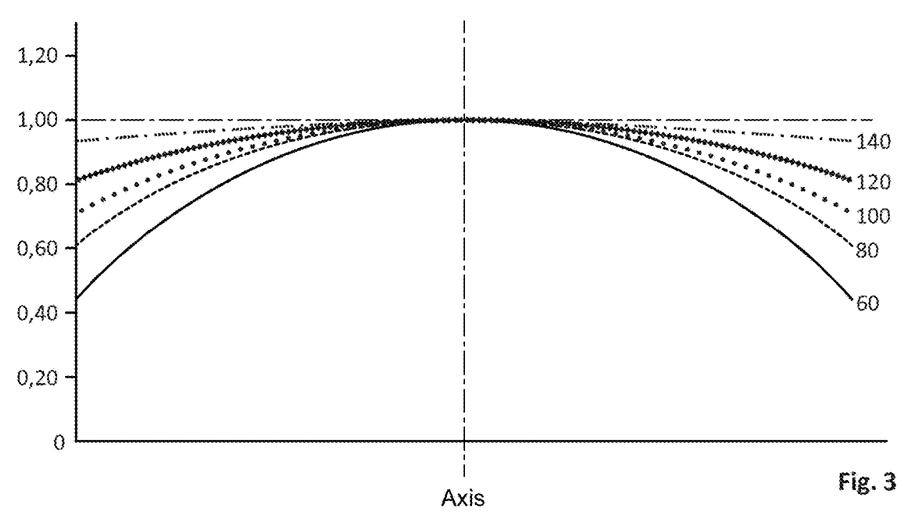
FIG. 3: an example of a plot of the change in the field of emission on the target as a function of the radiation pattern of the LEDs.

It is found in the diagram of FIG. 3 that the increase in the number of micro-LEDs does not lead to substantial variations in the uniformity of the illumination. The superposition of the illuminating cones of the micro-LEDs, selected at 120° in this example, leads to a very good uniformity.

Figure 4:
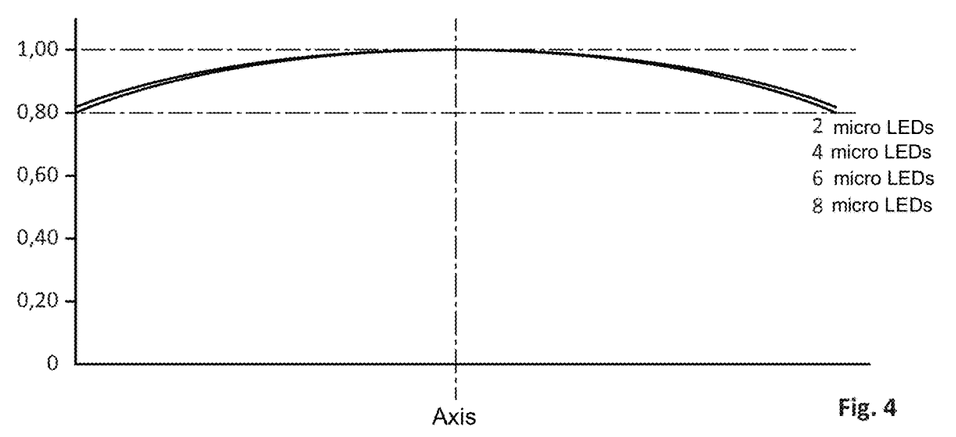
FIG. 4: an example of a plot of the change in the field of illumination on the target as a function of the number of LEDs.
Figure 5:
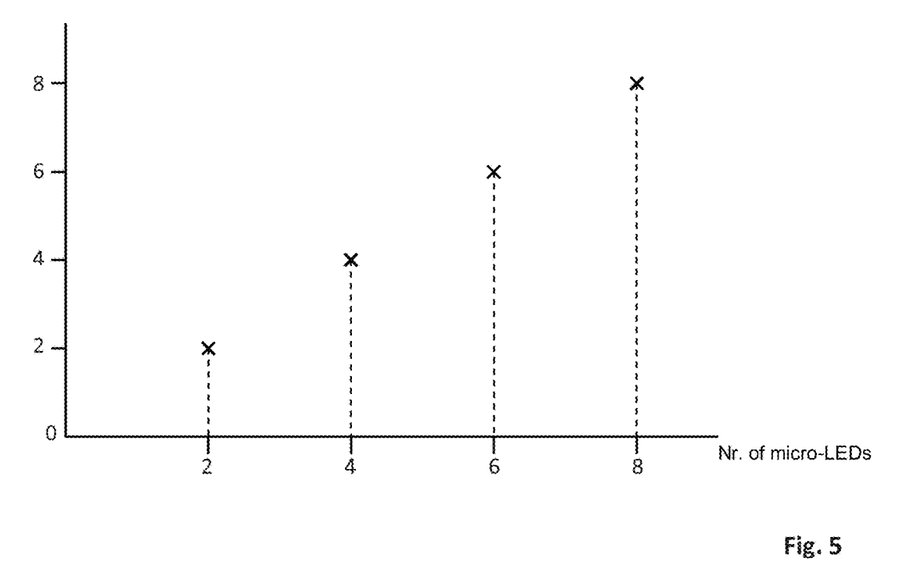
FIG. 5: an example of a plot of the change in the intensity on the axis of the total field on the target.

However, as can be found in the diagram of FIG. 4, the variation of the number of micro-LEDs leads to a change in the illuminating power, in a roughly proportional way. For the embodiment selected and for reasons of cost compromise, the selected number is 4 micro-LEDs per color, or 28 micro-LEDs placed on the ring.

In the best embodiment, 3 colors are brought together in one RGB micro-LED with the result that the number of micro-LEDs is reduced from 28 to 20 when the 4 above-mentioned sets of micro-LEDs are provided.

In fact, another parameter can decide the number of micro-LEDs to use.

Figure 6:
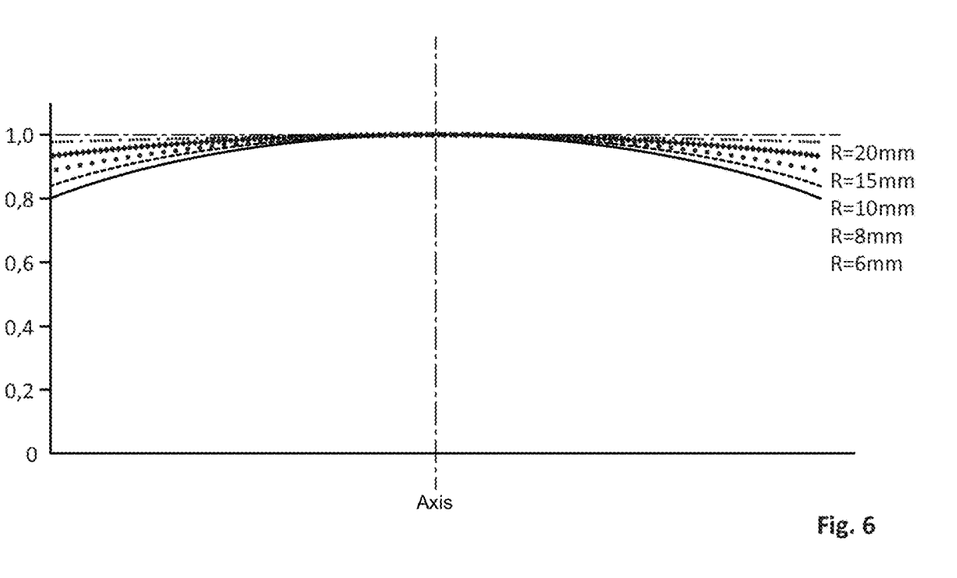
FIG. 6: a view of the change in the total field of illumination on the target as a function of the radius of the micro-LED ring.

Actually, it is possible to measure the effect of the radius of the ring carrying the micro-LEDs on the illuminated field.

If the micro-LEDs are distributed on a ring having a radius of between 6 and 10 mm, it is found that the variations are negligible.

Since miniaturization is sought as will be explained below, these radius values of between 6 and 10 mm are selected.

Moreover, it is found that to attain significant variations, it is necessary to have much greater diameters of 15 or 20 mm. It is noted then that the light power at the center of the target, in this case a tooth, is then reduced.

Nevertheless, this reduction varies especially beyond a radius of 10 mm.

To maintain the desired compactness, the selected radius of the ring is 7 mm. The radius is the distance from the center of the device on which all of the centers of the micro-LEDs are placed. This radius is the one on which the centers of the micro-LEDs are placed.

Figure 7:
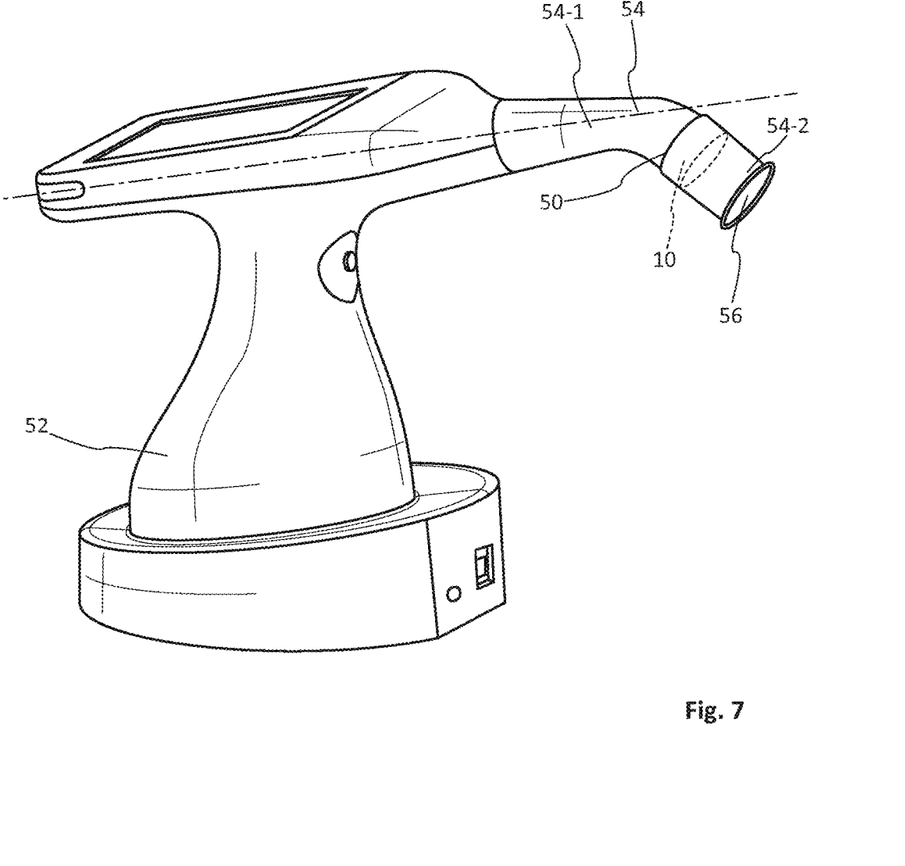
FIG. 7: apparatus for establishing color in perspective.

The apparatus for establishing color according to the invention thus comprises a support 50 of an illuminating device according to this invention provided with a handle 52, which is extended by a neck 54 extending along a longitudinal axis, said neck 54 comprising a proximal end 54-1, a distal end 54-2, preferably bent in relation to the longitudinal axis, said distal end 54-2 being provided with the illuminating device according to this invention.

The support 10 with its objective 12, illuminating means 14, image capturing means 16, a front-end protection 18 and reflective isolating means 20, is thus directly mounted in the neck 54, at its distal end 54-2, the neck 54 being advantageously hollow, at least over a portion of its length.

At the end, a positioning tip 56 is provided that is intended to bear against the tooth and thus ensure a constant distance for positioning the illuminating device in relation to the surface to be illuminated, in particular.

The arrangement of the various elements of the illuminating device in the blind cylinder 22 makes possible an easy assembly with the incorporation of a guide, if necessary, particularly to position the micro-LED support ring suitably.

Any mounting means can be envisaged to hold said blind cylinder 22, particularly a bayonet threaded ring.

Concerning the objective, as indicated in the preamble of the detailed description, the latter has been shown at the right of the illuminating ring, but it could be positioned set back provided that the field of vision passes through the ring, without disturbance by said ring. In this case, the reflective isolating means 20 are no longer necessary.

Figure 8:
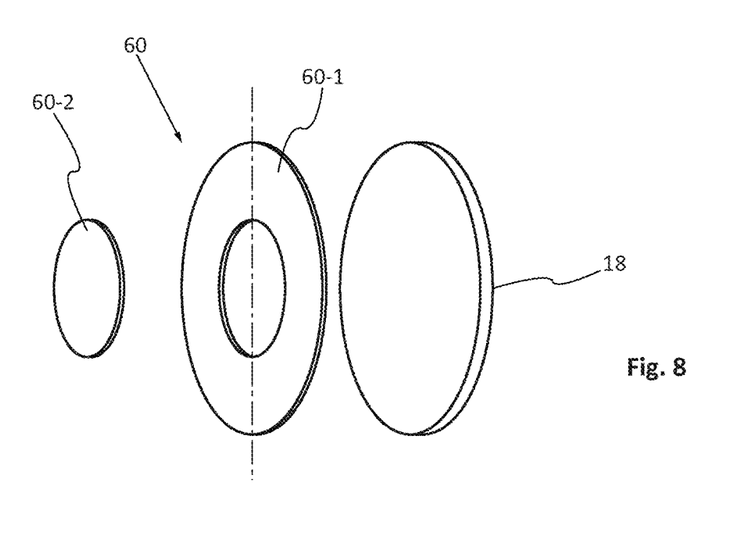
FIG. 8: a view of an improvement with the presence of a polarizing film.

According to another improvement of the invention, the addition of polarizing means 58 is provided.

In the selected embodiment, these polarizing means comprise a polarizing film 60.

The polarizing film 60 comprises a first part 60-1 and a second part 60-2 oriented at 90° in relation to one another, concentrically. A cutout 62 forming a guide is possible so as to have a perfectly crossed orientation of said two parts.

Advantageously, the polarizing film is positioned on the protective lens 18.

The first part 60-1 is positioned on the periphery of the protective lens 18; i.e., this film part is located on the path of the incident beam emitted by the illuminating means 14.

The second part 60-2 is placed in the central part, on the path of the beam of light reflected by the tooth D.

Figure 9A:
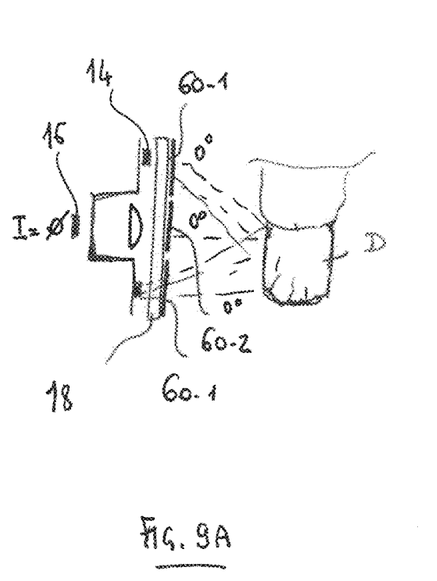
FIGS. 9A and 9B: a view of the pattern of the incident and reflected beams with respect to the incident beam and the reflected beam.

As shown in FIG. 9A, the light emitted by the illuminating means 14 is polarized by the first part 60-1 of the polarizing film, for example 0°, and the light that is directly reflected, it also at 0°, by the tooth D is blocked by the second part 60-2 of the polarizing film at 90°. The light intensity I received by the image capturing means 16 is zero.

Figure 9B:
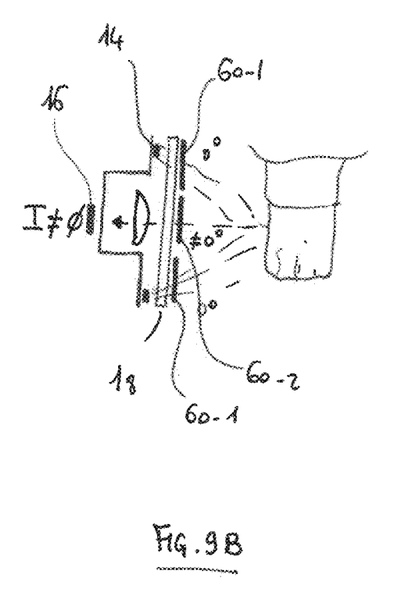

As shown in FIG. 9B, the light backscattered by the tooth sees its polarization changed, and this backscattered light passes through the second part 60-2 of the polarizing film and is propagated to the capturing means 16, through the objective.

The light intensity I received by the image capturing means 16 is not zero.

The disturbance generated by the direct reflection is eliminated, leading to an even greater image quality.

In the assembly shown, the image capturing means 16 are placed in the immediate proximity of the illuminating device, but they could be positioned anywhere, using a waveguide to guide the reflected waves that make up the image.

It is found that the possible constraints linked to the waveguide for the illumination are eliminated, that the production of the apparatus for establishing color as a whole is simplified, that the possible imperfections of the waveguide are inoperative, and that reproducibility is completely ensured.

The invention claimed is:

1. An illuminating device for an apparatus for establishing the color of a tooth, in a mouth, the illuminating device comprising:
    a support with an objective provided with at least one lens and a defined field of vision;
    an illuminating system disposed on the periphery of the field of vision of the objective and in the immediate proximity of the tooth, the illuminating system comprising
    micro-LEDs placed on the periphery of the field of vision of the objective, and
    an illuminating ring on which the micro-LEDs are mounted, the illuminating ring having an inside diameter approximately equal to the diameter of the field of vision of the objective to the right of the ring to come into the periphery of the field of vision of the objective;

an image capturing device;

a front-end protection; and a reflective isolating system isolating the objective in relation to the micro-LEDs, when the objective is placed to the right of the ring, the reflective isolating system comprising a reflective isolating annular screen, positioned downstream from the ring carrying the micro-LEDs with respect the light path and upstream from the front-end protection, the reflective isolating annular screen having an outside diameter corresponding to the inside diameter of the illuminating ring and an inside diameter greater than or equal to the diameter of the lens of the objective.

2. The illuminating device for the apparatus for establishing the color of a tooth, according to claim 1, wherein the micro-LEDs comprise four micro-LEDs of seven different colors, the micro-LEDs being distributed on/over a 7 mm diameter and having an angle of diffusion of greater than 120°.

3. The illuminating device for the apparatus for establishing the color of a tooth, according to claim 2, further comprising:

a blind cylinder that carries a peripheral collar on its free edge and configured to receive the illuminating system and that receives the image capturing device at the back and the objective on the front; and a power circuit positioned behind a base of the blind cylinder with connecting wire connecting the micro-LEDs and said power circuit.

4. The illuminating device for the apparatus for establishing the color of a tooth, according to claim 1, further comprising:

a blind cylinder that carries a peripheral collar on its free edge and configured to receive the illuminating system and that receives the image capturing device at the back and the objective on the front; and a power circuit positioned behind a base of the blind cylinder with connecting wire connecting the micro-LEDs and said power circuit.

5. An apparatus for establishing color incorporating the illuminating device according to claim 1, further comprising a support provided with a handle, which is extended by a neck that extends along a longitudinal axis, said neck comprising a proximal end, and a distal end, said distal end receiving said illuminating device.

6. The apparatus for establishing color incorporating the illuminating device according to claim 5, wherein the distal end is bent in relation to the longitudinal axis.

7. An apparatus for establishing color incorporating the illuminating device according to claim 1, further comprising a polarizing system with a first part positioned on the path of the incident beam emitted by the illuminating system polarizing at 0° and a second part polarizing at 90°, placed in a central part, on the path of the beam of light reflected and backscattered by the tooth.

8. The apparatus for establishing color incorporating the illuminating device according to claim 7, wherein the polarizing system consists of a film from which two concentric parts, oriented at 90° from one another, are cut out, with one cutout forming a guide.

\* \* \* \* \*